United States Patent [19]
Luode

[11] Patent Number: 5,806,618
[45] Date of Patent: Sep. 15, 1998

[54] FASTENING AND LIFTING SYSTEM FOR A BATTERY PACK OF AN ELECTRIC CAR

[75] Inventor: Voitto Luode, Järvenpää, Finland

[73] Assignee: Imatran Voima Oy, Ivo, Finland

[21] Appl. No.: 666,419

[22] PCT Filed: Dec. 12, 1994

[86] PCT No.: PCT/FI94/00562

§ 371 Date: Jun. 12, 1996

§ 102(e) Date: Jun. 12, 1996

[87] PCT Pub. No.: WO95/16583

PCT Pub. Date: Jun. 22, 1995

[30] Foreign Application Priority Data

Dec. 14, 1993 [FI] Finland ..................................... 935605

[51] Int. Cl.⁶ ................................................. B60R 16/04
[52] U.S. Cl. .................... 180/68.5; 248/503; 206/335; 429/99; 429/156
[58] Field of Search ........................... 180/68.5; 206/335; 429/96, 99, 100, 156, 159, 187; 248/309.1, 503

[56] References Cited

U.S. PATENT DOCUMENTS

| 4,020,244 | 4/1977 | Selinko | 429/100 |
| 4,367,572 | 1/1983 | Zielenski | 24/301 |
| 4,936,409 | 6/1990 | Nix et al. | 180/68.5 |
| 5,004,081 | 4/1991 | Custer | 180/68.5 |
| 5,037,711 | 8/1991 | Bonnaud et al. | 429/15.6 |
| 5,390,754 | 2/1995 | Masuyama et al. | 180/68.5 |

FOREIGN PATENT DOCUMENTS

| 0065349 | 11/1982 | European Pat. Off. . |
| 1267153 | 6/1961 | France . |
| 2245236 | 1/1992 | United Kingdom . |

Primary Examiner—Robert J. Oberleitner
Assistant Examiner—Pamela J. Lipka
Attorney, Agent, or Firm—Steinberg & Raskin, P.C.

[57] ABSTRACT

The present invention relates to an operation and handling system for batteries of an electric car, in which a fastening strap (20) has been arranged around the battery or batteries (15), by which strap (20) the battery or batteries have been made into one entity and secured to a battery box (10). The batteries have been secured to the car by means of the fastening strap (20) of the batteries (15).

20 Claims, 2 Drawing Sheets

FASTENING AND LIFTING SYSTEM FOR A BATTERY PACK OF AN ELECTRIC CAR

FIELD OF THE INVENTION

The present invention relates to a fastening and lifting system for a battery pack of an electric car, in which a fastening strap has been arranged around the battery or batteries, by means of which strap the battery or batteries has/ have been made into one entity and fastened to the battery box.

BACKGROUND OF THE INVENTION

It is known in the art to place the batteries of an electric car in a comparatively strongly-built box which is firmly secured to the car. When lifting batteries, e.g for service or repairs, the box has to be lifted, whereby the batteries are lifted therewith. In a state-of-art design, the bottom of the battery box is, when being installed in the car, first secured to the boot floor and thereafter holes are borred for battery fastening rods. The fastening rods extend through the car floor. Batteries are lifted on top of the bottom part of the box and secured with aluminium rails of the width of the entire battery pack. The batteries have been divided into two groups, and they are secured at the front and rear ends with aluminium angle members and between the groups with a T-shape member. The fastening rods extending through the bottom also extend through the aluminium members, that is, the batteries are in a way left compressed between the bottom part and said members. The cover of the battery box is secured with screws to the bottom part.

As regards the service of batteries, the oldfashioned battery box is very cumbersome for the reason that even for replacing one battery, nearly all batteries have to be dismounted from the anchorage thereof. Lifting batteries within a car is very difficult because of the scarce space. Since the batteries constitute the part which needs most service in an electric car, it is also of great importance that the entire car has to be left to stay in the service during the entire servicing.

The prior art battery box with fitting accessories has been rather expensive, and its fitting has been most timeconsuming, taking even four hours. The battery packs known in the art are considerably heavy, weighing about 400 to 700 kilos, so that the box has to be very strongly built, because of which the battery box has become heavy in weight and expensive in the prior art designs.

As regards the state of art, reference is made also to U.S. Pat. Nos. 5,037,711, 4,367,572, 4,936,409, 5,004,081, and 4,020,244, and to FR patents No. 1 267 153, and to EP application 0 065 349. In said references such arrangements have been disclosed in which either the batteries are clamped into a group with a strap, and the group is secured to a box, or the battery is secured with a strap to its box. In said state of art designs the battery box is secured with separate securing arrangements to the vehicle frame structures. In the state of art designs the battery box forms the construction carrying the weight of the batteries.

OBJECTS AND SUMMARY OF THE INVENTION

The object of the present invention is to provide an operation and handling system for the batteries of an electric car in which the battery pack is secured in place in the car and in which lifting the battery pack in conjunction with service is easy to carry out.

The aim of the present invention is also to provide an operation and handling system for the batteries of an electric car in which the battery box is light in weight but provides a reliable securing to the car, and the battery box is advantageous regarding the manufacturing costs.

For achieving the above aims and those to be disclosed below, the operation and handling system of the batteries of the invention is mainly characterized in that the batteries have been secured to the car by means of a battery strap.

As taught by the invention, the battery pack of an electric car is inserted in a box which is light in construction, and the securing of the batteries to the vehicle frame is accomplished by means of separate straps. The same straps can be used for lifting the batteries in service situations. According to the invention, the batteries have been tensioned with straps into one pack and within the car the straps are secured to the vehicle frame.

As taught by the invention, the battery pack with the box in its entirety is light in weight since the battery box no longer needs to be structurally a carrying part. As regards the expenditure, the design is advantageous, and dismounting of the battery box from the car and mounting therein is rapid. Furthermore, by means the operation and handling system of the battery pack of the invention, a secure locking of the batteries in place in the car is also achieved.

Another advantage of the invention is that the battery box can be formed more freely when it need not be a structure carrying the weight of the batteries. A battery box may therefore be formed in the best possible way, for instance considering ventilation of batteries.

A great advantage of the system of the invention is service-ability of batteries. Since the battery pack can be removed from a car very rapidly, the tie-up times of the car are very short during the service. The service jobs of the batteries can be performed in appropriate circumstances outside the car. A rapid replacement of a battery pack also enables use of several battery packs for one car, and charging of battery packs outside the car, even using three-phase chargers. The use value of the car is multiplied.

Fast battery replacements make a more active service of the batteries possible. It is easier to examine a dismounted battery pack, and probably there is no such hurry in doing so as with the car itself; consequently, more time is left for a thorough service and examination of the batteries.

On the other hand, active servicing enables finding faults in the batteries at an early stage so that an individual battery is not capable of damaging other batteries or the entire battery pack. Accelerated servicing has a notable effect on the driving costs per kilometer. The service measures can, according to the invention, be accomplished entirely outside the car, and not in the small interior of the car, which as such reduces risks of damage.

The invention may also be applied for other vehicles with comparable needs; for instance, for other electrically driven vehicles, particularly trucks.

BRIEF DESCRIPTION OF THE DRAWINGS

The invention is described below more in detail referring to the figures of the accompanying drawing, in which.

DETAILED DESCRIPTION OF THE DRAWINGS

Figure 1:
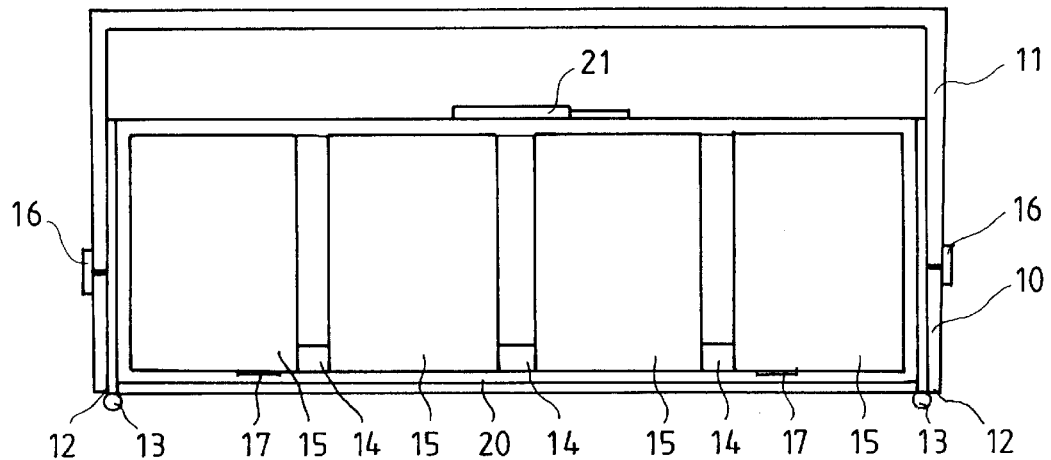
FIG. 1 presents schematically a cross-section of a battery pack and a battery box.

Referring to FIG. 1, four batteries 15 have been positioned in a battery box 10 which have been connected with a strap 20 to each other. The strap 20 winds around the batteries and it is carried through a hole 12 in the bottom of the battery box 10 to a fastening member 13 in the vehicle frame. The fastening strap 20 is provided with tensioning member 21 in order to adjust the tension appropriately. To prevent the batteries from being heated, gaps have been provided therebetween, e.g. by spacers 14.

When installing batteries 15 into the box 10, a strap 20 is carried through threading members 17, and the strap is wrapped around the batteries 15 and tensioned with a tensioning member 21, and the ends of the strap 20 are carried through the holes 12 of the battery box 10 to the fastening members 13 located in the frame of the car. The cover of the battery box 10 is indicated by reference numeral 11. In order to increase the service-ability, the cover 11 of the battery box may be provided with quick-release locks 16.

Figure 2:
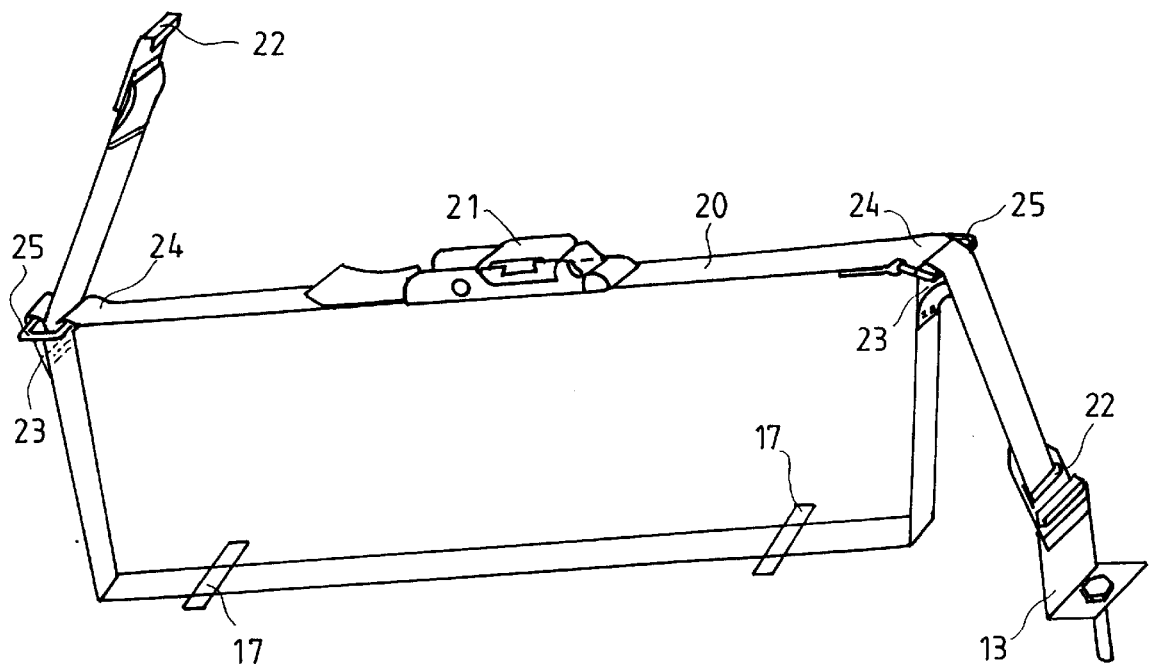
FIG. 2 presents schematically a strap for securing batteries.
Figure 2A:
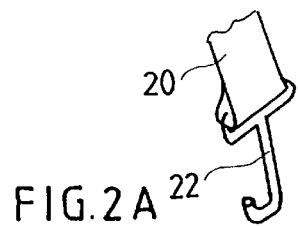
FIG. 2A presents schematically an alternative to the fastening member of the fastening strap.

FIG. 2 presents more in detail a strap 20 used for connecting batteries 15. The strap has been made into one band between members such as link parts 25, to which link parts the sections of the strap 20 are attached by loops 23,24. The strap 20 is tensioned with a tensioning means 21 around the batteries 15. At the ends of the strap 20 a fastening arrangement is provided, such as hooks 22, which are drawn to fastening members fastened to the frame of the car, e.g. to fastening hooks 13. FIG. 2A presents an alternative to a fastening hook 22 of the strap 20.

In the strap arrangement according to FIG. 2 the other end of strap 20 is presented in a position used in lifting a battery and a battery box away from their positions. The hook 22 is now fixed to a lifting means.

Figure 3:
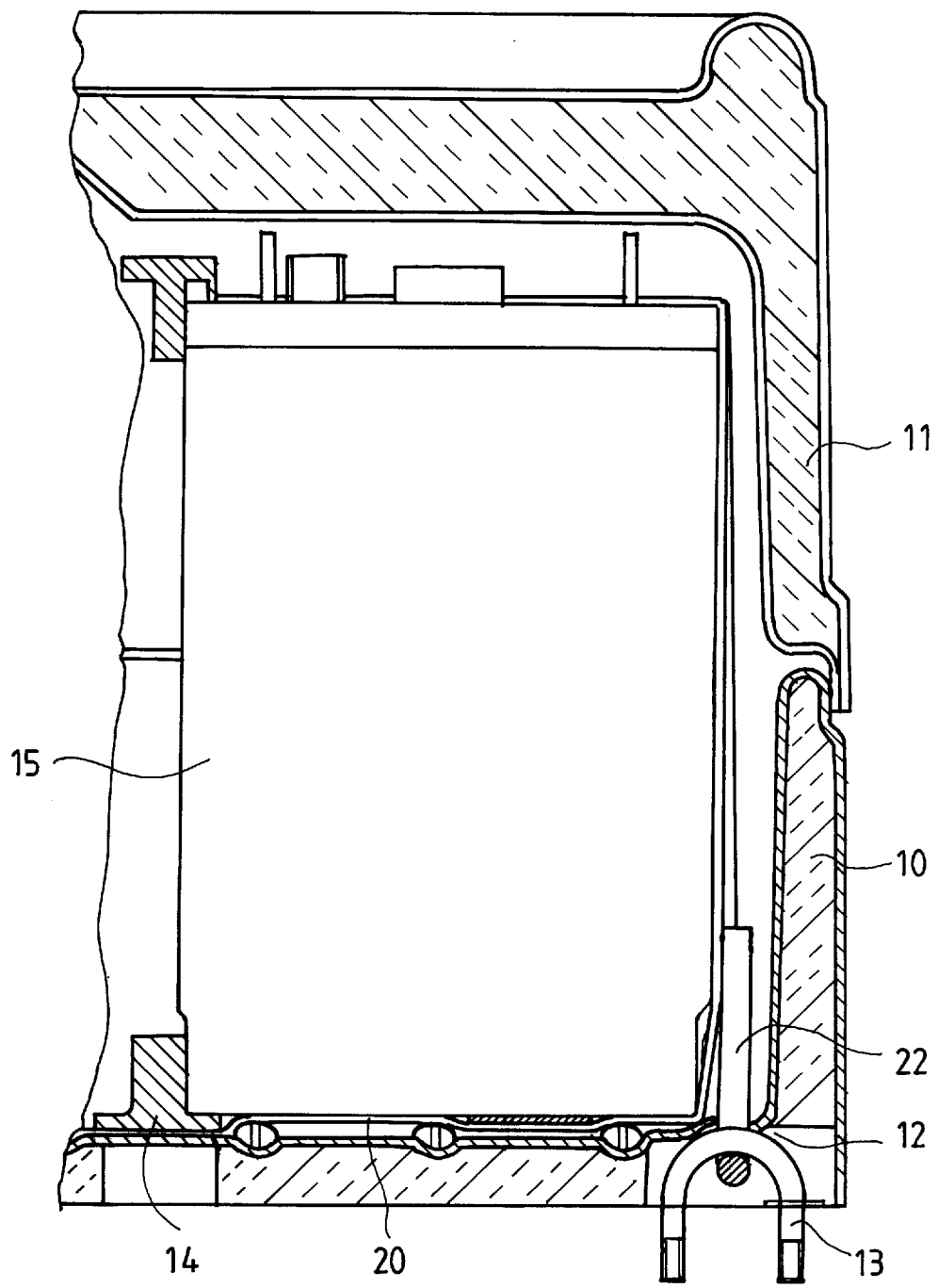
FIG. 3 presents schematically a cross-sectional partial image of a battery box with batteries.

FIG. 3 presents a schematical partial image in which a battery 15 has been placed on the bottom of a battery box 10, and a strap 20 goes around the battery 15, said strap being fastened by means of a fastening hook 22 to a fastening member 13 in the car frame. With spacers 14 a necessary air gap is provided between the batteries 15. The cover part of the battery box 10 is indicated by reference numeral 11.

Depending on the size of the battery pack of an electric car, the battery box may contain several groups formed by batteries 15, each group of which being secured to each other with a strap arrangement 20 of its own.

As becomes obvious in the figures, the box 10 is not as such secured in any way to the body parts of the car, but the securing of the box 10 takes place by means of batteries 15. A strap, that is, a tying band 20, runs around four successive batteries 15, and it is provided with fastening hooks 22. The fastening hooks 22 are drawn, when mounting the batteries 15 in the car, to the loops 13 fastened to the bottom of the car, and the strap 20 is tensioned in place. The bottom of the box 10 is in this way left compressed between the car frame and the batteries 15. The cover part 11 is secured to the box 10 e.g. by quick-release locks 16, which according to the regulations have to be ensured with screws openable with a tool. The battery pack can be prepared in advance to be ready for mounting entirely outside the car, while fitting the battery pack itself into the car will not take more than ten minutes.

Since the entire battery pack is easy to be dismount, the car need not be left in the service for any other reason than during a replacement of a battery pack, for about 10 to 15 minutes. The battery pack can thus be serviced without any hurry series productionwise in the sites and with tools designed specifically for it.

With the same bands 20 wherewith the batteries 15 are secured to the car, they can also be lifted out of the car by hooking the hooks 22 of the bands 20 into the loops of the lifting rod. In addition, replacing individual batteries is easier since the batteries have been fastened with bands provided with quick-release locks 21;22.

The invention is described above referring merely to the advantageous embodiments thereof, to the details of which the invention is not, however, intended to be strictly confined. A variety of modifications and applications are conceivable within the scope if the inventive idea defined by the annexed claims.

I claim:

1. A fastening and lifting system for batteries of an electric car having a frame and fastening members arranged in connection therewith, comprising:

a fastening strap structured and arranged to extend around the batteries such that the batteries are made into one entity which constitutes a battery pack, said strap comprising an elongate first section structured and arranged to extend over said battery pack, a link part arranged at each end of said first section, an elongate second section structured and arranged to extend under and on both sides of said battery pack said second section passing through said link parts arranged at said ends of said first section, and an end part arranged at each end of said second section, each of said end parts being adapted to be fastened to one of the fastening members on the car frame when said battery pack is secured to the car frame and to be fastened to a lifting apparatus when said battery pack is transferred to and from the car.

2. System according to claim 1, wherein said battery pack is secured by said strap to a battery box, said battery box having threading members, said strap being arranged to pass via said threading members in said battery box in order to position said strap in relation to the batteries and said battery box.

3. System according to claim 1, wherein said battery pack is secured by said strap to a battery box, said strap being adapted to pass through apertures in a bottom of said battery box to the fastening members in the frame of the car to compress the bottom of said battery box between the batteries and the car frame.

4. System according to claim 1, wherein each of said end parts of said strap comprises a hook adapted to be fastened to a fastening member in the frame structures of the car.

5. A fastening and lifting system for a battery pack of an electric car, comprising a battery housing arranged in the car and having an interior structured and arranged to house the battery pack, and a fastening strap for fixedly fastening said battery housing to the car, said strap comprising an elongate first section structured and arranged to extend over the battery pack, a link part arranged at each end of said first section, an elongate second section structured and arranged to extend under and on both sides of the battery pack, said second section passing through said link parts arranged at said ends of said first section, and an end part arranged at each end of said second section, each of said end parts being adapted to be fastened to a fastening member on the car frame when the battery pack is secured to the car frame and to be fastened to a lifting apparatus when the battery pack is transferred to and from the car.

6. The system of claim 5, wherein said strap is structured and arranged to extend completely around the battery pack.

7. The system of claim 5, wherein said at least one battery comprises a plurality of batteries, said unitary securing means extending around all of said plurality of batteries to fasten said plurality of batteries together.

8. The system of claim 5, further comprising at least one threading member arranged in said interior of said battery housing, said at least one threading member being structured and arranged to guide said strap and position said strap relative to the battery pack and said battery housing.

9. The system of claim 5, wherein said battery housing comprises a bottom panel having at least one aperture, said strap being arranged to pass from said interior of said battery housing through said at least one aperture to engage with the car.

10. The system of claim 5, further comprising tightening means for tightening said strap such that said bottom panel of said battery housing is situated between the battery pack and the car and is thus pressed against the car upon tightening of said strap by said tightening means.

11. The system of claim 5, further comprising cooperative fastening members arranged on ends of said strap and the car, said cooperative fastening members comprising said end parts on said second section of said strap.

12. The system of claim 11, wherein said each of said end parts comprises a hook, said cooperative fastening members further comprising compatible loops arranged on the fastening members of the car frame.

13. The system of claim 5, wherein said at least one battery comprises a plurality of batteries, further comprising spacer means for providing a space between adjacent ones of said plurality of batteries.

14. The system of claim 5, wherein said battery housing comprises a bottom member and a cover member releasably coupled to said bottom member to enable access to said at least one battery in said battery housing.

15. A fastening and lifting system for batteries of an electric car, comprising a battery housing arranged in the car and having an interior structured and arranged to house the batteries, and a fastening strap structured and arranged to fixedly fasten said battery housing to the car, said strap extending from said interior of said battery housing through said battery housing to the car to thereby fixedly fasten said battery housing to the car.

16. The system of claim 15, further comprising at least one threading member arranged in said interior of said battery housing, said threading member being structured and arranged to guide said strap and position said strap relative to the batteries and said battery housing.

17. The system of claim 15, wherein said battery housing comprises a bottom panel having at least one aperture, said strap being arranged to pass from said interior of said battery housing through said at least one aperture to engage with the car.

18. The system of claim 15, further comprising tightening means for tightening said strap such that said bottom panel of said battery housing is situated between the batteries and the car and is thus pressed against the car upon tightening of said strap by said tightening means.

19. The system of claim 15, further comprising cooperative fastening members arranged on ends of said strap and the car.

20. The system of claim 19, wherein said cooperative fastening members comprises hooks arranged at the ends of said strap and compatible loops arranged on a frame structure of the car.

* * * * *